United States Patent
Guibout et al.

(10) Patent No.: US 8,669,505 B2
(45) Date of Patent: Mar. 11, 2014

(54) SYSTEM FOR GUIDING A PROJECTILE

(75) Inventors: Vincent Guibout, Paris (FR); Eric Larcher, La Garenne-Colombes (FR)

(73) Assignee: MBDA France, Paris (FR)

( * ) Notice: Subject to any disclaimer, the term of this patent is extended or adjusted under 35 U.S.C. 154(b) by 157 days.

(21) Appl. No.: 13/120,614

(22) PCT Filed: Sep. 29, 2009

(86) PCT No.: PCT/FR2009/001160
§ 371 (c)(1),
(2), (4) Date: May 4, 2011

(87) PCT Pub. No.: WO2010/037929
PCT Pub. Date: Apr. 8, 2010

(65) Prior Publication Data
US 2011/0198435 A1     Aug. 18, 2011

(30) Foreign Application Priority Data
Sep. 30, 2008   (FR) .................................... 08 05366

(51) Int. Cl.
F41G 7/36 (2006.01)
F42B 15/01 (2006.01)
G05D 1/10 (2006.01)
G01C 21/10 (2006.01)
F41G 7/00 (2006.01)
G05D 1/00 (2006.01)

(52) U.S. Cl.
USPC ............ 244/3.2; 244/3.1; 244/3.15; 701/400; 701/408; 701/500; 701/505; 701/509; 701/510

(58) Field of Classification Search
USPC ........ 244/3.1–3.3, 75.1, 76 R, 175, 194, 195; 701/400, 408, 500, 505, 509, 510, 532, 701/533, 1, 3, 4, 11
See application file for complete search history.

(56) References Cited

U.S. PATENT DOCUMENTS

| | | | | |
|---|---|---|---|---|
| 4,234,142 A | * | 11/1980 | Yost et al. | 244/3.21 |
| 4,589,610 A | * | 5/1986 | Schmidt | 244/3.19 |
| 4,840,328 A | * | 6/1989 | Sundermeyer | 244/3.15 |
| 5,274,314 A | * | 12/1993 | Maqueira | 244/3.15 |
| 5,435,503 A | | 7/1995 | Johnson, Jr. et al. | |

(Continued)

FOREIGN PATENT DOCUMENTS

WO   WO2010/037929 A1   4/2010

OTHER PUBLICATIONS

International Search Report completed Dec. 18. 2009. mailedApril 1. 2010 from corresponding International Application No. PCT FR2009/001160, filed Sep. 29, 2009, (2 pages).

(Continued)

*Primary Examiner* — Bernarr Gregory
(74) *Attorney, Agent, or Firm* — Klein, O'Neill & Singh, LLP (57) ABSTRACT

The invention relates to a guidance system comprising estimation means able to estimate, in the course of flight, the attitude and the aerodynamic speed of a projectile, as well as the variations in the speed of the wind, on the basis of guidance orders formulated by guidance means of the guidance system, of a reference trajectory and of measurements obtained by measurement means of the system, using a model of the dynamic behavior of the projectile and a model of the dynamics of the wind.

20 Claims, 3 Drawing Sheets

(56) References Cited

U.S. PATENT DOCUMENTS

| | | | |
|---|---|---|---|
| 5,637,826 A * | 6/1997 | Bessacini et al. | 244/3.11 |
| 5,762,290 A * | 6/1998 | Dupont | 244/3.15 |
| 5,804,812 A * | 9/1998 | Wicke | 244/3.1 |
| 5,828,571 A * | 10/1998 | Bessacini et al. | 244/3.15 |
| 6,380,526 B1 * | 4/2002 | Kau | 244/3.2 |
| 6,456,906 B1 | 9/2002 | Hua | |
| 6,573,486 B1 | 6/2003 | Ratkovic et al. | |
| 6,666,410 B2 * | 12/2003 | Boelitz et al. | 244/3.2 |
| 6,808,139 B1 * | 10/2004 | Sturm | 244/3.11 |
| 7,233,859 B2 * | 6/2007 | Lundberg | 701/533 |
| 7,280,917 B2 * | 10/2007 | Hager et al. | 701/505 |
| 7,394,046 B2 * | 7/2008 | Olsson et al. | 244/3.1 |
| 7,566,026 B2 * | 7/2009 | Lam et al. | 244/3.15 |
| 8,165,795 B2 * | 4/2012 | Debailleul | 701/510 |

OTHER PUBLICATIONS

International Written Opinion completed Dec. 18, 2009, mailed Apr. 1, 2010 from corresponding International Application No. PCT FR2009/001160, filed Sep. 29, 2009, (4 pages).

* cited by examiner

SYSTEM FOR GUIDING A PROJECTILE

CROSS-REFERENCE TO RELATED APPLICATION(S)

This is a national phase application under 35 U.S.C. §371 of PCT Application No. PCT/FR2009/001160, filed Sep. 29, 2009, which claims the benefit of French application No. 08/05366, filed Sep. 30, 2008, the contents of which are expressly incorporated herein by reference.

FIELD OF ART

The present invention relates to a system for guiding a projectile, for example of the shell or rocket type, without any satellite assistance, as well as a projectile provided with such a guiding system.

BACKGROUND

As known, in the absence of satellite assistance (for example of the GPS type), the navigation function of a projectile is first implemented upon an initialization phase consisting in determining the attitude and the position of the projectile at an initial instant. Such an initialization phase is then followed with a propagation phase consisting in determining the position and the attitude of the projectile upon the flight through on-board measurement instruments within the projectile (for example, accelerometers, gyrometers, magnetometers, . . . ).

Now, in the case of a projectile shot from a gun, the on-board measurement instruments are unavailable during the gun shot as a result of very high lateral and axial accelerations (saturating the inertial unit of the projectile) and the environment of the gun (including the presence of ferromagnetic masses making the magnetometers of the projectile unusable). Consequently, the initialization of the navigational function cannot be carried out, the complete attitude of the projectile remaining then undetermined at the outlet of the muzzle of the gun.

For overcoming such an absence of measurement during the gun shot, it is known to determine the aerodynamic speed of the projectile from the reference trajectory at the outlet of the gun shot. However, such a determination is very approximate, as the actual trajectory of the projectile differs from the reference trajectory, making an accurate navigation of the projectile very difficult.

It is also known to estimate, in the course of flight, the attitude of the projectile using on-board magnetometers through measurement of the terrestrial magnetic field. However, the accuracy of the measurements being carried out remains limited and no information regarding the aerodynamic speed the projectile is however available.

Moreover, for a projectile supposed to be very stable and provided with gyrometers and accelerometers, it is known to measure the gravity with such on-board measurement instruments for estimating the attitude and the aerodynamic speed of the projectile during a ballistic flight phase. However, such an estimation of the aerodynamic speed could only be carried out upon the ballistic flight phase of the projectile. Moreover, the attitude estimation is strongly altered by any incidence uptake of the projectile (for example, as a result of the wind).

Furthermore, when the measurement instruments on-board the projectile are of a mean or bad quality, the inaccuracy on the estimation of the attitude of the projectile makes the navigation of the projectile very bad on a high flight duration.

SUMMARY

The present invention aims at overcoming such drawbacks and more specifically, at determining, with a high accuracy, the attitude and the aerodynamic speed of the projectile upon a flight, including upon the ballistic flight phase and the guided-piloted flight phase.

To this end, according to the invention, the system for guiding a projectile provided with at least one piloting actuator (a mobile aerodynamic surface, a pulser, . . . ) and comprising measuring means for physical parameters, a guidance computer and controlling means for said piloting actuator, said projectile having to follow a reference trajectory in the first flight instants and said guidance computer comprising:
  navigational means for determining the attitude and the position of the projectile upon a flight;
  guidance means for providing guidance orders from the attitude, the position and the goal position determined by said navigational means; and
  piloting means for establishing control orders, intended for said control means, from said guidance orders, is remarkable in that said guidance computer further comprises estimation means for estimating, in the course of flight, the attitude and the aerodynamic speed of the projectile, as well as the variations of the speed of the wind, from said guidance orders, said reference trajectory and said measurements obtained by said measurement means, while using a model of the dynamic behaviour of the projectile and a model of the wind dynamics.

Therefore, the estimation means of the guidance computer according to the invention allow, without any preliminary information (including about the position and the attitude of the projectile) and with a high accuracy, for the estimation of the attitude and the aerodynamic speed of the projectile, from variations of the speed of the wind as well as from any parameter of the measurement means.

Furthermore, such estimations are carried out throughout the flight of the projectile (ballistic flight phase, guided-piloted flight phase, . . . ) and can allow to increase, more specifically, the accuracy to the impact as well as the range of the projectile.

Furthermore, although the guiding system of this invention does not require any satellite assistance, it could be coupled to satellite navigational means, for example, of the GPS type.

Advantageously, said estimation means comprise equivalent piloting means (that is, implemented by a dynamic model of the piloting means) for determining, from said guidance orders provided by said guidance means, control orders equivalent to said control orders established by said piloting means.

Furthermore, advantageously, such equivalent piloting means comprise:
  a first comparator, connected to the outlet of said estimation means and to the outlet of said guidance means;
  a first gain, connected to the outlet of said first comparator;
  an integrator, connected to the outlet of said first gain;
  second comparator, connected to the outlet of said integrator and to the outlet of said estimation means; and
  a second gain, connected to the outlet of said second comparator.

According to a characteristic of the invention, the wind is modelled by a white noise filtered by an appropriate order filter (for example of the second or third order) within said model of the wind dynamics.

Advantageously, said estimation means comprise an extended Kalman filter.

Moreover, said navigational means comprise preferably at least:
- first integration means, connected to said measurement means, able to determine the attitude and the position of the projectile from measurements obtained by said measurement means;
- second integration means, connected to said measurement means and to said estimation means, able to determine the attitude and the position of the projectile from measurements obtained by said measurement means and the attitude estimated by said estimation means;
- third integration means, connected to said estimation means, able to determine the attitude and the position of the projectile from the estimation of the attitude and of the aerodynamic speed of the projectile as well as from variations of the speed of the wind; and
- fourth integration means able to determine the attitude and the position of the projectile from said reference trajectory;
- as well as supervision means, connected to said first, second, third and fourth integration means, for selecting, based on a selection criterion, one of said integration means, so that said navigational means are able to deliver the attitude and the position of the projectile determined by said selected integration means.

Advantageously, said measurement means comprise three gyrometers, three accelerometers and two magnetometers.

The present invention also relates to a guiding system such as previously specified.

BRIEF DESCRIPTION OF THE FIGURES

The FIGS. of the appended drawing will better explain how this invention can be implemented. In these FIGS., like reference numerals relate to like components FIG. 1 schematically shows, in a block-diagram, an embodiment of the present invention.

DETAILED DESCRIPTION

Figure 1:
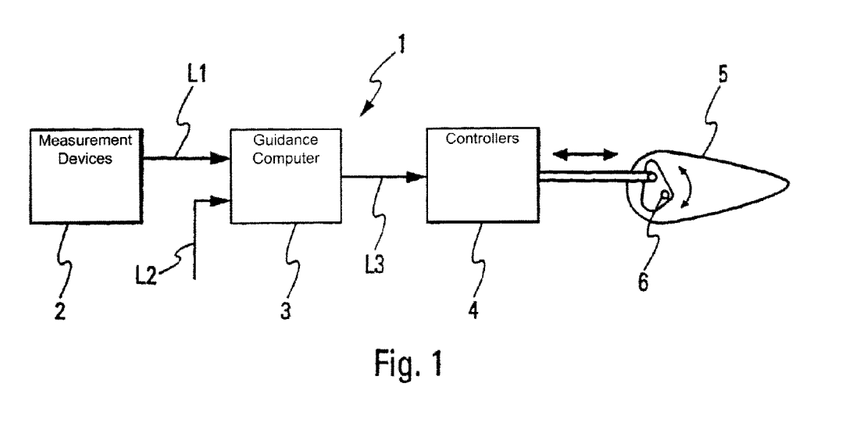

As shown on the block-diagram of FIG. 1, the guiding system 1 with no satellite assistance for a projectile (not shown), shot from a gun, comprises:
- measurement means 2 on-board the projectile delivering, at the outlet, via link L1, measurements of physical parameters. Such measurement means 2 comprise, for example, three gyrometers, three accelerometers and two magnetometers;
- a guidance computer 3, receiving the measurements obtained by the measurement means 2 (link L1) and, via the link L2, a reference trajectory associated with the flight of the projectile. The guidance computer 3 is able to deliver at the outlet, via the link L3, control orders transmitted to control means 4 to be further specified herein below;
- control means 4 receiving said control orders (link L3). Such control means 4 are able to point piloting actuators 5. On FIG. 1, as an illustrative example, piloting actuators 5 are illustrated by mobile aerodynamic surfaces 5 (for example, canard control surfaces) of the projectile around their rotation axis 6.

Figure 2:
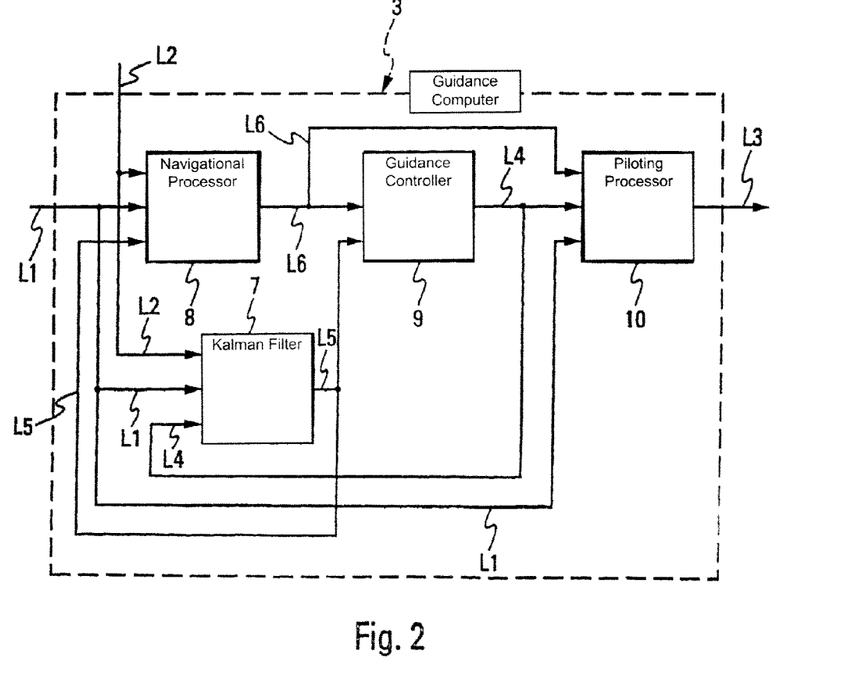
FIGS. 2 to 5 illustrate block-diagrams, respectively, of the guidance computer, the extended Kalman filter, the equivalent piloting means belonging to the extended Kalman filter and the navigational means, according to the embodiment of the present invention.

More particularly, according to the invention and as illustrated in the exemplary block-diagram of FIG. 2, the guidance computer 3 of the piloting system 1 comprises:
- an extended Kalman filter 7, with which a state vector X is associated and receiving the measurements obtained by the measurement means 2 (link L1), the reference trajectory (link L2) as well as guidance orders delivered at the outlet by guidance means 9 (as specified herein below), via the link L4. From such information, using a model of the dynamic behaviour of the projectile and a model of the wind dynamics (detailed further on), the Kalman filter 7 is able to deliver at the outlet, via the link L5, an estimation of the attitude and the aerodynamic speed of the projectile, variations of the speed of the wind, the instantaneous rotation vector as well as any parameter associated with the measurement means 2, throughout the flight of the projectile. From such estimations, the kinematic speed of the projectile can be deduced;
- navigational means 8, receiving measurements from the measurement means 2 (link L1), the reference trajectory (link L2) as well as estimations from the extended Kalman filter 7 (link L5). The navigational means 8 are able to deliver at the outlet, via the link L6, the position and the attitude of the projectile throughout the flight;
- guidance means 9, receiving the attitude and the position of the projectile (link L6) as well as estimations from the extended Kalman filter 7 (link L5). The guidance means 9 are able to deliver at the outlet (link L4) guidance orders according to a guiding law implementing, for example, a proportional navigation with a bias allowing for a compensation and a shaping of the trajectory; and
- piloting means 10, receiving the measurements obtained by the measurement means 2 (link L1), the guidance orders from the guidance means 9 (link L4), as well as the attitude and the position of the projectile delivered by the navigational means 8 (link L6). The piloting means 10 are able to deliver at the outlet (link L3) the control orders transmitted to the control means 4 of the mobile aerodynamic surfaces 5.

Figure 3:
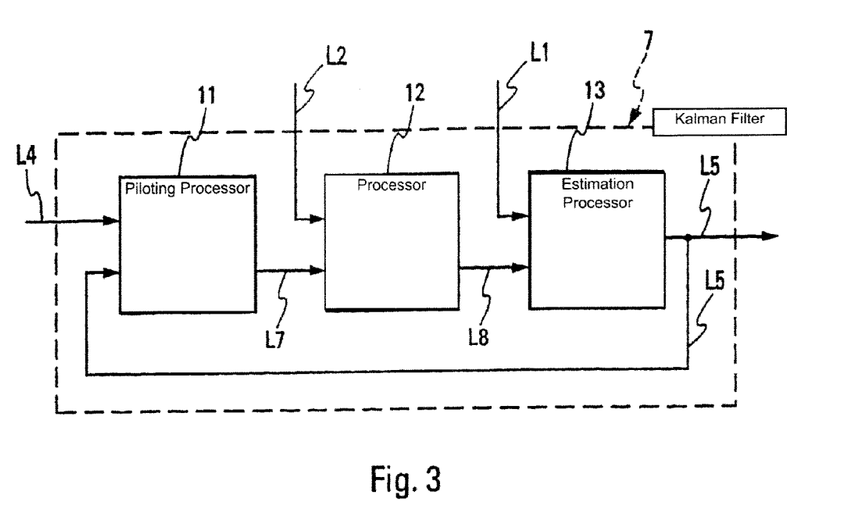

FIG. 3 shows an exemplary block-diagram of the extended Kalman filter 7 according to the embodiment of the invention. Such an extended Kalman filter 7 comprises:
- equivalent piloting means 11 (described hereinafter with respect to FIG. 4), receiving at the input (link L4) the guidance orders established by the guidance means 9 and estimations of the state vector X (associated with the Kalman filter 7) delivered by resetting means 13 (described hereinafter), via the link L5. The equivalent piloting means 11 are able to deliver at the outlet, via the link L7, control orders being equivalent to the control orders provided by the piloting means 10;
- calculation means 12, receiving the reference trajectory (link L2) as well as the equivalent control orders (link L7) transmitted by the equivalent piloting means 11. From equations associated with the dynamics of the Kalman filter (detailed further on), the calculation means 12 are able to deliver unset estimations of the state vector X; and
- resetting means 13, receiving the measurements obtained by the measurement means 2 (link L1) as well as the unset estimations transmitted by the calculation means 12. The resetting means are able to reset the unset estimations from the obtained measurements (link L1) so as to deliver at the outlet (link L5) reset estimations of the state vector X associated with the Kalman filter 7.

The flight of the projectile can for example be distributed according to the three following successive flight phases:
- a first initial flight phase, starting immediately after the gun shot, during which the measurement means 2 are unavailable (too high axial and lateral accelerations, disturbance of the magnetic field inside the gun);
- a second ballistic flight phase during which the projectile is only submitted to the action of gravity. The measurement means 2 are from now on able to carry out measurements; and
- a third guided-piloted flight phase during which the canard control surfaces 5 of the projectile are extended. The projectile is then submitted, in addition to gravity, to the action of the canard control surfaces 5.

During the initial flight phase, the determination of the attitude and the aerodynamic speed of the projectile is carried out as known from the reference trajectory, as no measurement is available.

Upon the ballistic flight phase, the measurement means 2 are usable and the extended Kalman filter 7 is initialized.

For being able to estimate the attitude of the projectile, the extended Kalman filter 7 uses flight mechanics equations and the action of gravity: its direction supplies the vertical, while its amplitude supplies the pitching angle of the projectile.

In order to observe the gravity, it is necessary to write the flight mechanics equations involving the latter. Assuming the projectile is in self rotation, it is advisable to work in the demodulated reference point as associated with the projectile comprising axes deduced from the axes (Xe,Ye,Ze) connected to the projectile, through demodulating the integral of the rolling speed, indicated $\phi^*$.

The following relations are then obtained:

$$\varphi^*(t) = \int_{\tau=0}^{\tau=t} p(\tau) d\tau$$

$$\overline{u}_a = u_a$$

$$\overline{v}_a = v_a \cos(\varphi^*) - w_a \sin(\varphi^*)$$

$$\overline{w}_a = v_a \sin(\varphi^*) + w_a \cos(\varphi^*)$$

$$\overline{p} = p$$

$$\overline{q} = q \cos(\varphi^*) - r \sin(\varphi^*)$$

$$\overline{r} = q \sin(\varphi^*) + r \cos(\varphi^*)$$

where:
- $(u_s, v_s, w_s)$ are the components of the aerodynamic speed vector according to the axes of the reference point (Xe, Ye, Ze) associated with the projectile, with Xe being the longitudinal axis and Ye and Ze the transversal axes freezed at shot time such that (Xe,Ye,Ze) is a direct orthonormed reference point;
- $(\overline{u}_o, \overline{v}_o, \overline{w}_o)$ are the components of the aerodynamic speed vector according to the axes the demodulated reference point of $\phi^*$ associated with the projectile;
- (p,q,r) are the components of the instantaneous rotation vector according to the axes of the reference point associated with the projectile; and
- $(\overline{p}, \overline{q}, \overline{r})$ are the components of the instantaneous rotation vector according to the axes of the demodulated reference point of $\phi^*$ associated with the projectile.

In the demodulated reference point of $\phi^*$ associated with the projectile, the force equations are ten as follows:

$\dot{u}_a = -g \sin(\theta) + \Gamma_x + \overline{r}\overline{v}_a - \overline{q}\overline{w}_a - \dot{u}_v$ $\dot{\overline{v}}_a = g \sin(\theta)\sin(\phi-\phi^*) - QS_{ref}\overline{C}_y(V_a, \overline{\beta}_a) - u_a\overline{r} - \dot{\overline{v}}_v$ $\dot{\overline{w}}_a = g \cos(\theta)\cos(\phi-\phi^*) + QS_{ref}\overline{C}_z(V_a, \overline{\alpha}_a) + u_a\overline{q} - \dot{\overline{w}}_v$ where:
- the sign <<·>> corresponds to the derivative with respect to time;
- $(\psi,\theta,\phi)$ are the three Euler angles respectively representing the yaw angle, the pitching angle and the rolling angle associated with the projectile passing from the local geographical trihedron the projectile, to the reference point of the projectile (Xe,Ye,Ze);
- $(\overline{\alpha}_a, \overline{\beta}_a)$ represent respectively the incidence and the aerodynamic sideslip in the demodulated reference point of $\phi^*$ associated with the projectile such that:

$(\overline{\alpha}_a, \overline{\beta}_a) = (\arctan(\overline{w}_a/\overline{u}_a) \arcsin(\overline{v}_a/\sqrt{\overline{u}_a^2 + \overline{v}_a^2 + \overline{w}_a^2}))$

- $\Gamma_x$ is the axial acceleration along the longitudinal axis of the projectile; and
- $(\overline{u}_v, \overline{v}_v, \overline{w}_v)$ are the components of the speed vector of the wind in the demodulated reference point of $\phi^*$ associated with the projectile.

Assuming the wind is horizontal, if $(W_x, W_y, 0)$ represents the components of the wind in the direct inertial reference point (Xo,Yo,Zo) (Xo representing the axis along the gun-target line and Zo representing the downward oriented vertical), then:

$$\begin{pmatrix} \dot{u}_v \\ \dot{v}_v \\ \dot{w}_v \end{pmatrix} = T_{R_0 \to R} \begin{pmatrix} \dot{W}_x \\ \dot{W}_y \\ 0 \end{pmatrix} - \begin{pmatrix} p \\ q \\ r \end{pmatrix} \wedge \begin{pmatrix} u_v \\ v_v \\ w_v \end{pmatrix} \text{ with:}$$

$$T_{R_0 \to R} = \begin{pmatrix} \cos(\psi)\cos(\theta) & \sin(\psi)\cos & -\sin(\theta) \\ \cos(\psi)\sin(\theta)\sin(\varphi) - \sin(\psi)\cos(\varphi) & \sin(\psi)\sin(\theta)\sin(\varphi) + \cos(\psi)\cos(\varphi) & \cos(\theta)\sin(\varphi) \\ \cos(\psi)\sin(\theta)\cos(\varphi) + \sin(\psi)\sin(\varphi) & \sin(\psi)\sin(\theta)\cos(\varphi) - \cos(\psi)\sin(\varphi) & \cos(\theta)\cos(\varphi) \end{pmatrix}$$

where Ro=(Xo,Yo,Zo) and R=(Xe,Ye,Ze).

After calculation, the following E1 equations are obtained:

$\dot{u}_a = -g \sin(\theta) + \Gamma_x + \overline{r}\overline{v}_a - \overline{q}\overline{w}_a - \cos(\psi)\cos(\theta)\dot{W}_x - \sin(\psi)\cos(\theta)\dot{W}_y$ $\dot{\overline{v}}_a = g \sin(\theta)\sin(\phi-\phi^*) + QS_{ref}\overline{C}_y(V_a, \overline{\beta}_a) - u_a\overline{r} - (\cos(\psi)\sin(\theta)\sin(\phi) - \sin(\psi)\cos(\phi))\dot{W}_x - (\sin(\psi)\sin(\theta)\sin(\phi) + \cos(\psi)\cos(\phi))\dot{W}_y$ $\dot{\overline{w}}_a = g \cos(\theta)\cos(\phi-\phi^*) + QS_{ref}\overline{C}_z(V_a, \overline{\alpha}_a) - u_a\overline{q} - (\cos(\psi)\sin(\theta)\cos(\phi) - \sin(\psi)\sin(\phi))\dot{W}_x - (\sin(\psi)\sin(\theta)\cos(\phi) + \cos(\psi)\sin(\phi))\dot{W}_y$ Similarly, the E2 flight mechanics moment equations are written in the demodulated reference point of $\phi^*$ associated with the projectile:

$\dot{p} = 0$ $\dot{\overline{q}} = \frac{1}{I_y}(QS_{ref}l_{ref}\overline{C}_m(V_a, \overline{\alpha}_a) + M_q\overline{q} - \overline{p}\overline{r}I_x)$ $\dot{\overline{r}} = \frac{1}{I_y}(QS_{ref}l_{ref}\overline{C}_n(V_a, \overline{\beta}_a) + M_q\overline{r} - \overline{p}\overline{q}I_x)$ where:
- $M_q = QS_{ref}l_{ref}C_{mq}$ with $C_{mq}$ the pitching damping coefficient, Q is the dynamic pressure, $l_{ref}$ is the reference length and $S_{ref}$ is the reference surface for the definition of the projectile aerodynamics;
- $\overline{C}_m$ and $\overline{C}_n$ are the aerodynamic moment coefficients, being function of the demodulated aerodynamic speed Va, aerodynamic incidence $\overline{\alpha}_a$ and aerodynamic sideslip $\overline{\beta}_a$ $\phi^*$ respectively in pitching and yawing modes, at the gravity centre of the projectile, in the demodulated reference point of $\phi^*$ associated with the projectile; and $I_x$ and $I_y$ are the respectively axial and transverse inertias.

For describing the dynamics of the projectile, the equations are used connecting the instantaneous rotation vector of the projectile (expressed in the demodulated reference point of $\phi^*$ associated with the projectile), the Euler angles and their derivative.

The kinematics of the projectile supplies the following E3 equations:

$$\dot{\psi} = (\bar{q}\sin(\phi-\phi^*)+\bar{r}\cos(\phi-\phi^*))/\cos(\theta)$$

$$\dot{\theta} = \bar{q}\cos(\phi-\phi^*)-\bar{r}\sin(\phi-\phi^*)$$

$$\dot{\phi} = p+(\bar{q}\sin(\phi-\phi^*)+\bar{r}\cos(\phi-\phi^*))\tan(\theta)$$

The set of E1, E2 and E3 equations describes completely the dynamics of the projectile and including the action of gravity.

When the instantaneous rotation vector and the aerodynamic speed vector are known or measured at an instant t, then the E1, E2 and E3 equations allow their evolutions to be predicted.

For determining the kinematic speed of the projectile, two cases could occur:
- either the speed of the wind is perfectly known (for example, by reading in a table), then the kinematic speed of the projectile could be deduced from the aerodynamic speed $V_{kinematics}=V_{aerodynamics}+V_{wind}$ and the E1, E2 and E3 equations are sufficient for estimating the kinematic speed of the projectile;
- or the speed of the wind is not known, then it is not possible to estimate the kinematic speed of the projectile. Nevertheless, assuming that the speed of the wind is known at a flight instant (for example, at the beginning of a flight), it becomes possible to estimate the variations of the wind and thus to estimate the speed of the wind in the course of flight (the derivative of the speed of the wind being directly involved in the E1 equations).

For estimating the speed of the wind, the wind is modelled by a white noise filtered by an appropriate order filter, for example, of the second order. To this end, the model of the wind dynamics is used, as defined by the following E4 equations:

$$\dot{W}_x = j_x$$

$$\dot{W}_y = j_y$$

$$\dot{*j}_x = -2\xi\omega\dot{W}_x - \omega^2 W_x$$

$$\dot{*j}_y = -2\xi\omega\dot{W}_y - \omega^2 W_y$$

where $\xi$ and $\omega$ are control parameters representing the pulse and the damping of the model of the wind.

Thus, the E1, E2, E3 and E4 equations allow the dynamics of the projectile and the wind to be described. The set of these equations allows, more specifically, the attitude of the projectile as well as the aerodynamic speed and the variations of the speed of the wind to be described.

The extended Kalman filter then possesses 13 states. The state vector is defined by $$\hat{X}=[\hat{u}_a, \hat{v}_a, \hat{w}_a, \hat{p}, \hat{q}, \hat{r}, \hat{\psi}, \hat{\theta}, \hat{\phi}, \hat{j}_x, \hat{j}_y, \hat{W}_x, \hat{W}_y]$$ and its dynamics is described by the following equations:

$$\dot{\hat{u}}_a = -g\sin(\hat{\theta}) + \Gamma_x + \hat{r}\hat{v}_a - \hat{q}\hat{w}_a - \cos(\hat{\psi})\cos(\hat{\theta})\hat{j}_x - \sin(\hat{\psi})\cos(\hat{\theta})\hat{j}_y$$

$$\dot{\hat{v}}_a = g\sin(\hat{\theta})\sin(\hat{\phi}-\varphi^*) + QS_{ref}\bar{C}_y(\hat{V}_a, \hat{\beta}_a) - \hat{u}_a\hat{r} - (\cos(\hat{\psi})\sin(\hat{\theta})\sin(\hat{\phi}) - \sin(\hat{\psi})\cos(\hat{\phi}))\hat{j}_x - (\sin(\hat{\psi})\sin(\hat{\theta})\sin(\hat{\phi}) + \cos(\hat{\psi})\cos(\hat{\phi}))\hat{j}_y$$

$$\dot{\hat{w}}_a = g\cos(\hat{\theta})\cos(\hat{\phi}-\varphi^*) + QS_{ref}\bar{C}_z(\hat{V}_a, \hat{\alpha}_a) + \hat{u}_a\hat{q} - (\cos(\hat{\psi})\sin(\hat{\theta})\cos(\hat{\phi}) - \sin(\hat{\psi})\sin(\hat{\phi}))\hat{j}_x - (\sin(\hat{\psi})\sin(\hat{\theta})\cos(\hat{\phi}) + \cos(\hat{\psi})\sin(\hat{\phi}))\hat{j}_y$$

$$\dot{\hat{p}} = 0$$

$$\dot{\hat{q}} = \frac{1}{I_y}(QS_{ref}l_{ref}\bar{C}_m(\hat{V}_a, \hat{\alpha}_a) + M_q\hat{q} - \hat{p}\hat{r}I_x)$$

$$\dot{\hat{r}} = \frac{1}{I_y}(QS_{ref}l_{ref}\bar{C}_n(\hat{V}_a, \hat{\beta}_a) + M_q\hat{r} - \hat{p}\hat{q}I_x)$$

$$\dot{\hat{\psi}} = (\hat{q}\sin(\hat{\phi}-\varphi^*) + \hat{r}\cos(\hat{\phi}-\varphi^*))/\cos(\hat{\theta})$$

$$\dot{\hat{\theta}} = \hat{q}\cos(\hat{\phi}-\varphi^*) - \hat{r}\sin(\hat{\phi}-\varphi^*)$$

$$\dot{\hat{\phi}} = \hat{p} + (\hat{q}\sin(\hat{\phi}-\varphi^*) + \hat{r}\cos(\hat{\phi}-\varphi^*))\tan(\hat{\theta})$$

$$\dot{\hat{W}}_x = \hat{j}_x$$

$$\dot{\hat{W}}_y = \hat{j}_y$$

$$\dot{\hat{j}}_x = -2\xi\omega\hat{j}_x - \omega^2\hat{W}_x$$

$$\dot{\hat{j}}_y = -2\xi\omega\hat{j}_y - \omega^2\hat{W}_y$$

where $\dot{q}^*=\hat{p}$ and the indication $\ll\hat{}\gg$ refers to an estimation.

In order to advantageously take into account the shortcomings of the measurement means 2, 5 complementary states are added to the state vector X of the Kalman filter 7:
- two states $d_y$ and $d_z$ corresponding to the off-centring of the respective pitching and yawing accelerometers;
- two states $c_q$ and $c_r$ corresponding to the setting error of the respective pitching and yawing gyrometers; and
- a state $f_p$ corresponding to a scale factor of the rolling gyrometer.

The state vector of the extended Kalman filter 7 then comprises 18 states such that $$\hat{X}=[\hat{u}_a, \hat{v}_a, \hat{w}_a, \hat{p}, \hat{q}, \hat{r}, \hat{\psi}, \hat{\theta}, \hat{\phi}, \hat{j}_x, \hat{j}_y, \hat{W}_x, \hat{W}_y, \hat{f}_p, \hat{c}_q, \hat{c}_r, \hat{d}_y, \hat{d}_z],$$

the dynamics of such five states is defined by the following equations:

$$\dot{\hat{f}}_p = 0$$

$$\dot{\hat{c}}_q = 0$$

$$\dot{\hat{c}}_r = 0$$

$$\dot{\hat{d}}_y = 0$$

$$\dot{\hat{d}}_z = 0$$

Upon the guided-piloted flight phase, the projectile is submitted to the action of canard control surfaces in the addition to gravity. The instantaneous rotation vector of the projectile has from now on two main contributions: the action of the control surfaces and the action of gravity.

In order to take into account the action of the control surfaces upon the guided-piloted flight phase, the E2 flight mechanics moment equations are modified (previously established for the ballistic flight phase).

The aerodynamic moment coefficients could be linearized as follows:

$$\overline{C}_m = \overline{C}_{m\alpha}\overline{\alpha} + \overline{C}_{m\beta}\overline{\eta}$$

$$\overline{C}_n = \overline{C}_{n\beta}\overline{\beta} + \overline{C}_{n\zeta}\overline{\zeta}$$

where:
  $\overline{\eta}$ and $\overline{\zeta}$ represent the respective pitching and yawing locks in the demodulated reference point of $\phi^*$ associated with the projectile;
  $\overline{C}_{m\alpha}$ and $\overline{C}_{m\zeta}$ are the parts of the aerodynamic moment coefficient $\overline{C}_m$ respectively depending on $\overline{\alpha}$ and $\overline{\eta}$;
  $\overline{C}_{n\beta}$ and $\overline{C}_{n\zeta}$ are the parts of the aerodynamic moment coefficient $\overline{C}_n$ respectively depending on $\overline{\beta}$ and $\overline{\zeta}$.

The following relationships are further achieved:

$$\overline{q}_{BS} = \overline{q} + \hat{c}_q \hat{p}\cos(\phi^*) - \hat{c}_r \hat{p}\sin(\phi^*)$$

$$\overline{r}_{BS} = \overline{r} + \hat{c}_q \hat{p}\sin(\phi^*) - \hat{c}_r \hat{p}\cos(\phi^*)$$

where $\overline{q}_{BS}$ and $\overline{r}_{BS}$ represent an estimation of the measurements carried out by the gyrometers in the demodulated reference point of $\phi^*$ associated with the projectile.

From the previous relationships, the variables $$\hat{\overline{q}}^*_{BS}$$

and $$\hat{\overline{r}}^*_{BS}$$

are determined, subtracting again the angular speed due to gravity at $$\hat{\overline{q}}^*_{BS}$$

and $$\hat{\overline{r}}^*_{BS}.$$

As a result, $$\hat{\overline{q}}^*_{BS} = \hat{\overline{q}} + \hat{c}_q \hat{p}\cos(\varphi^*) - \hat{c}_r \hat{p}\sin(\varphi^*) + g\cos(\theta)\cos(\varphi - \varphi^*)/\hat{V}$$

$$\hat{\overline{r}}^*_{BS} = \hat{\overline{r}} + \hat{c}_q \hat{p}\sin(\varphi^*) + \hat{c}_r \hat{p}\cos(\varphi^*) - g\cos(\theta)\sin(\varphi - \varphi^*)/\hat{V}$$

where $\hat{V}$ stands for the module of the estimated kinematic speed of the projectile.

After calculation, the following E5 pitching and yawing moment equations are obtained:

$$\dot{\hat{\overline{q}}} = \omega_c(\hat{I}_q - \hat{\overline{q}}^*_{BS}) + \frac{1}{I_y}\left(QS_{ref}l_{ref}(\overline{C}_{m\alpha}\hat{\overline{\alpha}}_a + C_{mq}\hat{\overline{q}}) - \hat{p}\hat{r}I_x\right)$$

$$\dot{\hat{\overline{r}}} = \omega_c(\hat{I}_r - \hat{\overline{r}}^*_{BS}) + \frac{1}{I_y}\left(QS_{ref}l_{ref}(\overline{C}_{n\beta}\hat{\overline{\beta}}_a + C_{mq}\hat{\overline{r}}) - \hat{p}\hat{q}I_x\right)$$

$$\dot{\hat{I}}_q = K_1(\overline{q}_{co} - \hat{\overline{q}}^*_{BS})$$

$$\dot{\hat{I}}_r = K_1(\overline{r}_{co} - \hat{\overline{r}}^*_{BS})$$

where the gain $$K_1 = \frac{\omega_c}{n}$$

with n=2.

Furthermore, the equation $\dot{p}=0$ established for the ballistic flight phase is advantageously modified by the following approximation:

$$\dot{p} = \text{signe}(p_{co}-\hat{p})\min(\omega_r(p_{co}-\hat{p}), \dot{p}_{max})$$

where $\dot{p}_{max}$ represents the rolling speed saturation issued from the piloting means 10 and $p_{co}$ stands for the rolling speed controlled by the guidance means 9.

For describing the projectile upon the guided-piloted flight phase, the two states $I_g$ and $I_r$ are introduced in the state vector X of the Kalman filter 7.

Furthermore, two scale factors $K_{C_m}$ and $K_{C_N}$ bearing on the force and aerodynamic moment coefficients are also introduced into the state vector X.

Thus, according to the invention, for the piloted-guided flight phase, the extended Kalman filter 7 possesses 22 states such that:

$$\hat{X} = [\hat{u}_a, \hat{v}_a, \hat{w}_a, \hat{p}, \hat{q}, \hat{r}, \hat{\psi}, \hat{\theta}, \hat{\phi}, \hat{j}_x, \hat{j}_y, \hat{W}_x, \hat{W}_y, \hat{I}_p, \hat{c}_q, \hat{c}_r,$$
$$\hat{d}_y, \hat{d}_z, \hat{K}_{C_m}, \hat{K}_{C_y}, \hat{I}_q, \hat{I}_r]$$

The dynamics the Kalman filter 7 is described by the following equations:

$$\begin{cases}
\dot{\hat{u}}_a = -g\sin(\hat{\theta}) + \Gamma_x + \hat{\hat{r}}\hat{v}_a - \hat{\hat{q}}\hat{w}_a - \cos(\hat{\psi})\cos(\hat{\theta})\hat{j}_x - \sin(\hat{\psi})\cos(\hat{\theta})\hat{j}_y \\
\dot{\hat{v}}_a = g\sin(\hat{\theta})\sin(\hat{\phi} - \varphi^*) + QS_{ref}\overline{C}_y(\hat{V}_a, \hat{\overline{\beta}}_a) - \hat{u}_a\hat{r} - \\
\quad (\cos(\hat{\psi})\sin(\hat{\theta})\sin(\hat{\phi}) - \sin(\hat{\psi})\cos(\hat{\phi}))\hat{j}_x - (\sin(\hat{\psi})\sin(\hat{\theta})\sin(\hat{\phi}) + \\
\quad \cos(\hat{\psi})\cos(\hat{\phi}))\hat{j}_y \\
\dot{\hat{w}}_a = g\cos(\hat{\theta})\cos(\hat{\phi} - \varphi^*) + QS_{ref}\overline{C}_z(\hat{V}_a, \hat{\overline{\alpha}}_a) + \hat{u}_a\hat{\overline{q}} - \\
\quad (\cos(\hat{\psi})\sin(\hat{\theta})\cos(\hat{\phi}) - \sin(\hat{\psi})\sin(\hat{\phi}))\hat{j}_x - (\sin(\hat{\psi})\sin(\hat{\theta})\cos(\hat{\phi}) + \\
\quad \cos(\hat{\psi})\sin(\hat{\phi}))\hat{j}_y \\
\dot{\hat{p}} = \text{signe}(p_{co} - \hat{p})\min(\omega_r(p_{co} - \hat{p}), \dot{p}_{max}) \\
\dot{\hat{\overline{q}}} = \omega_c(I_q - \hat{\overline{q}}^*_{BS}) + \frac{1}{I_y}(QS_{ref}l_{ref}(\hat{K}_{C_m}\overline{C}_{m\alpha}\hat{\overline{\alpha}}_a + C_{mq}\hat{\overline{q}}) - \hat{p}\hat{r}I_x) \\
\dot{\hat{\overline{r}}} = \omega_c(\hat{I}_r - \hat{\overline{r}}^*_{BS}) + \frac{1}{I_y}(QS_{ref}l_{ref}(\hat{K}_{C_N}\overline{C}_{n\beta}\hat{\overline{\beta}}_a + C_{mq}\hat{\overline{r}}) - \hat{p}\hat{q}I_x) \\
\dot{\hat{\psi}} = (\hat{\overline{q}}\sin(\hat{\phi} - \varphi^*) + \hat{\overline{r}}\cos(\hat{\phi} - \varphi^*))/\cos(\hat{\theta}) \\
\dot{\hat{\theta}} = \hat{\overline{q}}\cos(\hat{\phi} - \varphi^*) - \hat{\overline{r}}\sin(\hat{\phi} - \varphi^*) \\
\dot{\hat{\phi}} = \hat{p} + (\hat{\overline{q}}\sin(\phi + \varphi^*) + \hat{\overline{r}}\cos(\hat{\phi} - \varphi^*))\tan(\hat{\theta}) \\
\dot{\hat{W}}_x = \hat{j}_x
\end{cases}$$

-continued $$\begin{cases} \dot{\hat{W}}_y = \hat{j}_y \\ \dot{\hat{j}}_x = -2\xi\omega\hat{j}_x - \omega^2\hat{W}_x \\ \dot{\hat{j}}_y = -2\xi\omega\hat{j}_y - \omega^2\hat{W}_y \\ \dot{\hat{f}}_p = 0, \dot{\hat{c}}_q = 0, \dot{\hat{c}}_r = 0, \dot{\hat{d}}_y = 0, \dot{\hat{d}}_z = 0 \\ \dot{\hat{K}}_{C_N} = 0 \\ \dot{\hat{K}}_{C_m} = 0 \\ \dot{\hat{I}}_q = K_1(\bar{q}_{co} - \hat{\bar{q}}^*_{BS}) \\ \dot{\hat{I}}_r = K_1(\bar{r}_{co} - \hat{\bar{r}}^*_{BS}) \end{cases}$$

The 22 state Kalman filter determined considering the guided-piloted flight phase could also be implemented for the ballistic flight phase.

Furthermore, the measurements of the three gyrometers and the three accelerometers of the measurement means 2 are implemented as follows by the resetting means 13 so as to reset the states of the Kalman filter.

Figure 4:
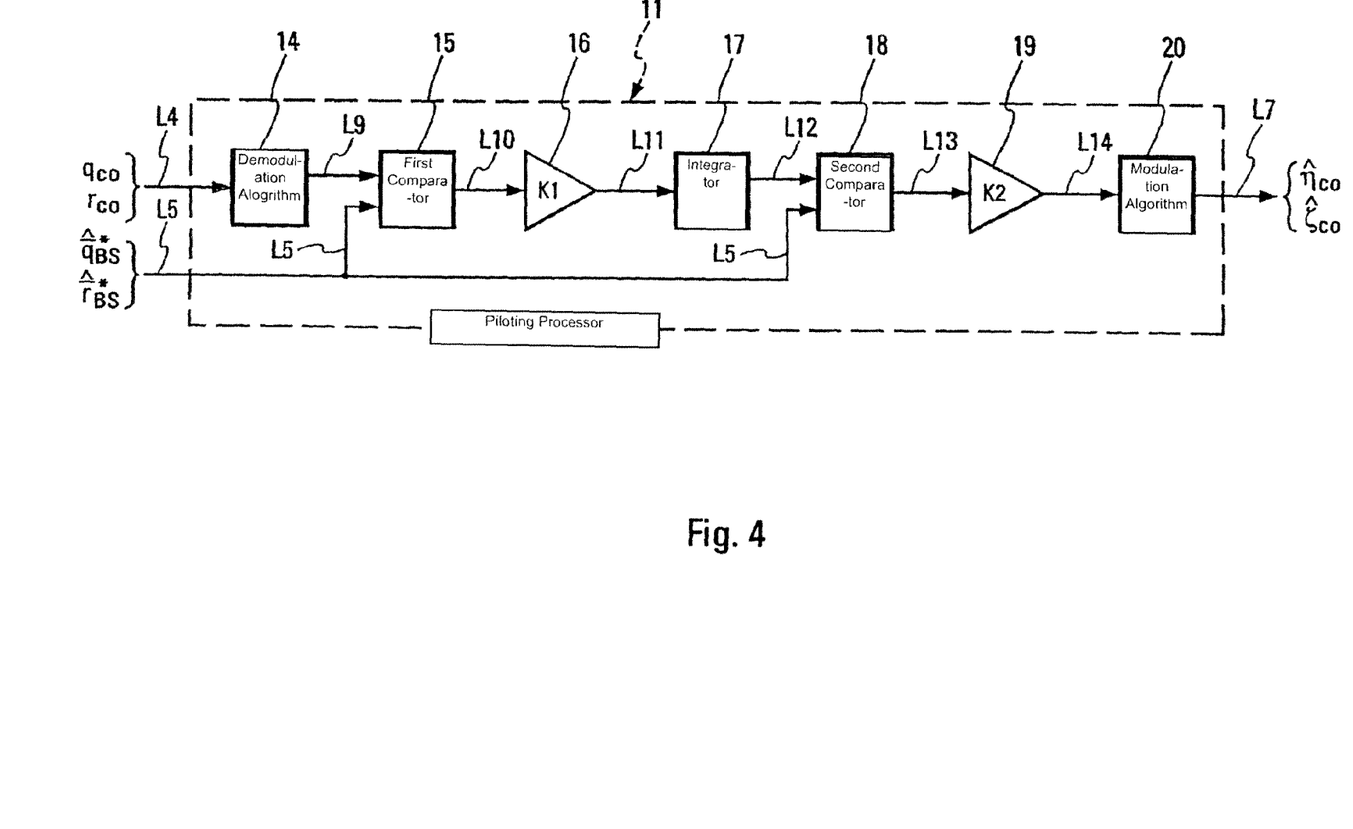

Are compared:

$p_i^{measure}$: with $\hat{p} + \hat{f}_p\hat{p}$ $q_d^{measure} \cos(\phi^*) - r_{measured} \sin(\phi^*)$ with $\bar{\hat{q}} + \hat{c}_q\hat{p} \cos(\phi^*) - \hat{c}_r\hat{p} \sin(\phi^*)$ $q_d^{measure} \sin(\phi^*) + r_{measured} \cos(\phi^*)$ with $\bar{\hat{r}} + \hat{c}_q\hat{p} \cos(\phi^*) + \hat{c}_r\hat{p} \cos(\phi^*)$ $\Gamma_{measured}^y \cos(\phi^*) - \Gamma_{measured}^z \sin(\phi^*)$ with $QS_{ref}\hat{K}_{C_N}\hat{C}_y + \hat{d}_y\hat{p}^2 \cos(\phi^*) - \hat{d}_z\hat{p}^2 \sin(\phi^*)$ $\Gamma_{measured}^y \sin(\phi^*) - \Gamma_{measured}^z \cos(\phi^*)$ with $QS_{ref}\hat{K}_{C_N}\hat{C}_z + \hat{d}_y\hat{p}^2 \sin(\phi^*) + \hat{d}_z\hat{p}^2 \sin(\phi^*)$ FIG. 4 shows an exemplary block-diagram of the equivalent piloting means 11 of the Kalman filter 7. The equivalent piloting means 11 comprise:

demodulation means 14, receiving the guidance orders $q_{co}$ and $r_{co}$ in the reference point connected to the projectile (link L4). The demodulation means 14 are able to carry out a change of reference point of the guidance orders $q_{co}$ and $r_{co}$ from the reference point connected to the projectile at the demodulated reference point of $\phi^*$ associated with the projectile and to deliver at the outlet, via the link L9, the demodulated guidance orders of $\phi^*$ $\bar{q}_{co}$ and $\bar{r}_{co}$;

a first comparator 1 receiving the demodulated guidance orders from $\phi^*$ $\bar{q}_{co}$ and $\bar{r}_{co}$ (link L9) as well as variables $$\hat{\bar{q}}^*_{BS}$$

and $$\hat{\bar{r}}^*_{BS}$$

transmitted by the resetting means 13 (link L5). The first comparator 15 is able to deliver at the outlet, via the link L10, a signal representative of the difference $$\bar{q}_{co} - \hat{\bar{q}}^*_{BS}$$

and the difference $$\bar{r}_{co} - \hat{\bar{r}}^*_{BS};$$

the first gain K1, referred to as 16, connected the outlet of the comparator 15. The first gain 16 is able to deliver in outlet, via the link L11, a signal representative of $$K_1(\bar{q}_{co} - \hat{\bar{q}}^*_{BS})$$

and $$K_1(\bar{r}_{co} - \hat{\bar{r}}^*_{BS});$$

an integrator 17, connected to the outlet of the gain 16. The integrator 17 is able to deliver at the outlet, via the link L12, a signal representative of the integration $$K_1 \int (\bar{q}_{co} - \hat{\bar{q}}^*_{BS}) dt$$

and the integration $$K_1 \int (\bar{r}_{co} - \hat{\bar{r}}^*_{BS}) dt;$$

a second comparator 18, connected to the outlet of the integrator 17 and receiving the variables $$\hat{\bar{q}}^*_{BS}$$

and $$\hat{\bar{r}}^*_{BS}$$

transmitted by the resetting means 13 (link L5). The second comparator 18 is able to deliver at the outlet, via the link L13, a signal representative of the difference $$K_1 \int (\bar{q}_{co} - \hat{\bar{q}}^*_{BS}) dt - \hat{\bar{q}}^*_{BS}$$

and the difference $$K_1 \int (\bar{r}_{co} - \hat{\bar{r}}^*_{BS}) dt - \hat{\bar{r}}^*_{BS};$$

a second gain K2, referred to as 19, connected to the outlet of the second comparator 18. The second gain 19 is able to deliver at the outlet, via the link L14, a signal representative of $$K_2\left(K_1 \int (\bar{q}_{co} - \hat{\bar{q}}_{BS}^*) dt - \hat{\bar{q}}_{BS}^*\right)$$

and $$K_2\left(K_1 \int (\bar{r}_{co} - \hat{\bar{r}}_{BS}^*) dt - \hat{\bar{r}}_{BS}^*\right);$$

modulation means 20, connected to the gain outlet 19, able to deliver to their outlet (link L7) control orders $\hat{\eta}_{co}$ and $\hat{\zeta}_{co}$ equivalent to control orders from the piloting means 10.

Thus, the equivalent control orders (before modulation by the modulation means 20) are defined by the following equations:

$$\hat{\eta}_{co} = K_2\left(K_1 \int (\bar{q}_{co} - \hat{\bar{q}}_{BS}^*) dt - \hat{\bar{q}}_{BS}^*\right)$$

$$\hat{\zeta}_{co} = K_2\left(K_1 \int (\bar{r}_{co} - \hat{\bar{r}}_{BS}^*) dt - \hat{\bar{r}}_{BS}^*\right)$$

Figure 5:
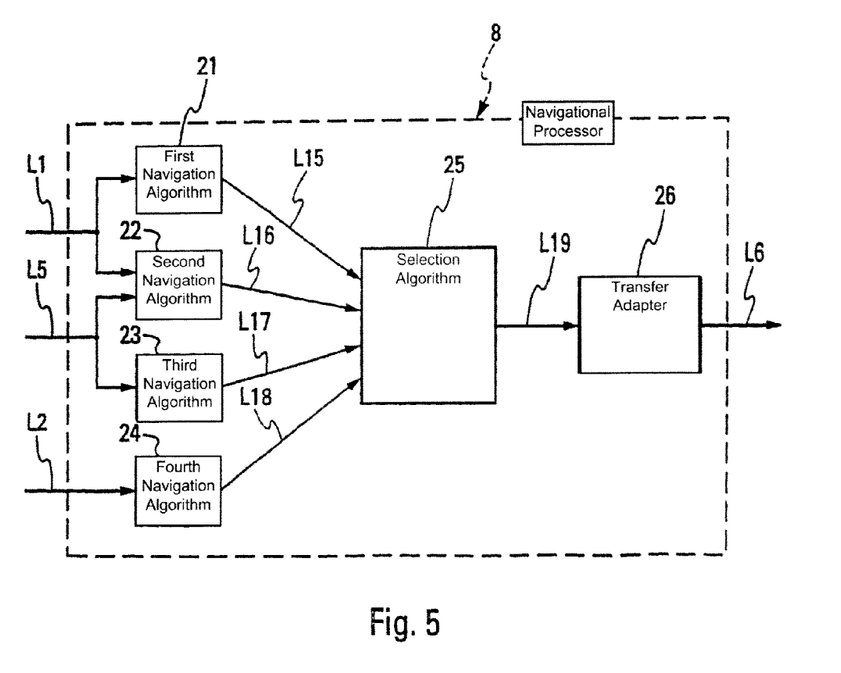

On FIG. 5, an exemplary block-diagram is shown, illustrating the navigational means 8 of the guidance computer 3 according to the embodiment of this invention.

The navigational means 8 comprise:
first integration means 21, receiving the measurements obtained by said measurement means 2 (link L1). The first integration means 21 are able to deliver at the outlet, via the link L15, the attitude and the position of the projectile;
second integration means 22, receiving the measurements obtained by the accelerometers of the measurement means 2 (link L1) and the attitude estimated by the extended Kalman filter 7 (link L5). The second integration means 22 are able to deliver at the outlet, via the link L16, the attitude and the position of the projectile;
third integration means 23, receiving the estimations of the aerodynamic speed and the variations of the speed of the wind achieved by the Kalman filter 7 (link L5). The third integration means are able deliver at the outlet, via the link L17, the attitude and the position of the projectile;
fourth integration means 24, receiving the reference trajectory (link L2). They are able to deliver at the outlet, via the link L18, the attitude and the position of the projectile;
supervision means 25, receiving the attitude and the position of the projectile determined by the first 21, the second 22, the third 23 and the fourth 24 integration means (links respectively L15, L16, L17 and L18). The supervision means 25 are able to select, for each flight phase of the projectile, the determined position and attitude corresponding to a maximum navigation according to a criteria such as the load factor of the projectile or the time that has elapsed. They can thereby deliver at the outlet, via the link L19, the position and the attitude of the projectile determined by the integration means selected for each flight phase. They are also able to make the guidance means 9 operational; and
transfer means 26, receiving the position and the attitude of the projectile determined (link L19) by the selected integration means.

The invention claimed is:
1. A guiding system for a projectile provided with at least one piloting actuator and comprising measuring means for measuring physical parameters, a guidance computer and controlling means for controlling said piloting actuator, said projectile having to follow a reference trajectory in first flight instants and said guidance computer comprising:
navigational means for determining an attitude, a position of the projectile upon a flight, and a goal position;
guidance means for providing guidance orders from the attitude, the position and the goal position determined by said navigational means; and
piloting means for establishing control orders, intended for said controlling means, from said guidance orders;
wherein said guidance computer further comprises estimation means for estimating, in the course of flight, the attitude and an aerodynamic speed of the projectile, as well as variations of wind speed, from said guidance orders, said reference trajectory and measurements obtained by said measuring means, using a model of dynamic behaviour of the projectile and a model of wind dynamics.
2. The system according to claim 1, wherein said estimation means comprises equivalent piloting means for determining, from said guidance orders provided by said guidance means, control orders equivalent to said control orders established by said piloting means.
3. The system according to claim 2, wherein said equivalent piloting means comprises:
a first comparator, connected to the outlet of said estimation means and to the outlet of said guidance means;
a first gain, connected to the outlet of said first comparator;
an integrator, connected to the outlet of said first gain;
a second comparator, connected to the outlet of said integrator and to the outlet of said estimation means; and
a second gain, connected to the outlet of said second comparator.
4. The system according to claim 1, wherein the wind is modelled by a white noise filtered within said model of the wind dynamics.
5. The system according to claim 1, wherein said estimation means comprises an extended Kalman filter.
6. The system according to claim 1, wherein said navigational means comprise at least:
first integration means, connected to said measurement means, for determining the attitude and the position of the projectile from measurements obtained by said measurement means;
second integration means, connected to said measurement means and to said estimation means, for determining the attitude and the position of the projectile from measurements obtained by said measurement means and the attitude estimated by said estimation means;
third integration means, connected to said estimation means, for determining the attitude and the position of the projectile from the estimation of the attitude and the aerodynamic speed of the projectile as well as from variations of the speed of the wind; and
fourth integration means for determining the attitude and the position of the projectile from said reference trajectory;

and said navigational means further comprises supervision means, connected to said first, second, third and fourth integration means, for selecting, based on a selection criterion, one of said integration means, so that said navigational means is configured to deliver the attitude and the position of the projectile determined by said selected integration means.

7. The system according to claim 1, wherein said measuring means comprises three gyrometers, three accelerometers and two magnetometers.

8. The system according to claim 1, further comprising a casing for the guidance computer.

9. A projectile comprising a guidance system comprising at least one piloting actuator, measuring devices for obtaining physical parameter measurements, a guidance computer and controls for said piloting actuator, said projectile having a reference trajectory when launched and said guidance computer comprising:
a navigational device programmed to determine an attitude, a position of the projectile upon a flight, and a goal position;
a guidance device programmed to provide guidance orders from the attitude, the position, and the goal position determined by said navigational device; and
a piloting device programmed to establish control orders from said guidance orders;
wherein said guidance computer further comprises an estimation algorithm configured to estimate the attitude, an aerodynamic speed, and wind speed variations when the projectile is launched from said guidance orders; and
wherein said reference trajectory and said measurements obtained by said measurement devices are obtained by using, at least in part, a dynamic behaviour model of the projectile and a wind dynamics model.

10. The system according to claim 9, wherein said estimation algorithm comprises an extended Kalman filter.

11. The system according to claim 9, wherein said piloting device comprises:
a first comparator, directly or indirectly receiving output from said estimation algorithm and said guidance device;
a first gain, connected to the outlet of said first comparator;
an integrator, connected to the outlet of said first gain;
a second comparator, connected to the outlet of said integrator and receiving the output of said estimation algorithm; and
a second gain, connected to the outlet of said second comparator.

12. The system according to claim 9, wherein said navigational device comprises:
a first navigation algorithm configured to determine the attitude and the position of the projectile from measurements obtained by said measurement devices;
a second navigation algorithm configured to determine the attitude and the position of the projectile from measurements obtained by said measurement devices and the attitude estimated by said estimation algorithm;
a third navigation algorithm configured to determine the attitude and the position of the projectile from the estimation of the attitude and the aerodynamic speed of the projectile as well as from variations of the wind speed; and
a fourth navigation algorithm configured to determine the attitude and the projectile position from said reference trajectory;
wherein said navigational device further comprises a selection algorithm for selecting one of said first through third navigation algorithms.

13. The system according to claim 9, wherein said measurement devices comprise a plurality of gyrometers, a plurality of accelerometers and a plurality of magnetometers.

14. The system according to claim 9, wherein the guidance orders are determined according to a guiding law implementing a proportional navigation with a bias allowing for a compensation and a shaping of the trajectory.

15. A method for guiding a projectile comprising:
providing a guidance system for a projectile comprising at least one measuring device for measuring physical parameters, at least one piloting actuator, controls for said piloting actuator, a guidance device, and a guidance computer comprising a navigational device;
obtaining a reference trajectory and the physical parameters with the at least one measuring device;
determining, in the navigational device, an attitude and a position of the projectile in flight;
providing guidance orders, determined by the guidance device using the attitude, the position and the goal position provided by the navigational device;
creating control orders based on said guidance orders;
calculating an estimate of an attitude and an aerodynamic speed of the projectile; and
calculating wind speed variations.

16. The method according to claim 15, wherein the calculating step comprises using an estimation algorithm with an extended Kalman filter.

17. The method according to claim 16, wherein said estimation algorithm further comprises an equivalent piloting algorithm.

18. The method according to claim 15, wherein said navigational device comprises:
a first navigation algorithm configured to determine the attitude and the position of the projectile from measurements obtained by said measurement devices;
a second navigation algorithm configured to determine the attitude and the position of the projectile from measurements obtained by said measurement devices and the attitude estimated by said estimation process;
a third navigation algorithm configured to determine the attitude and the position of the projectile from the estimation of the attitude and the aerodynamic speed of the projectile as well as from variations in wind speed; and
a fourth navigation algorithm configured to determine the attitude and the position of the projectile from said reference trajectory;
wherein said navigational device further comprises a selection algorithm for selecting one of said navigation algorithms so that said navigational device is configured to deliver the attitude and the position of the projectile determined by said selected navigation algorithm.

19. The method according to claim 15, wherein said measurement devices comprise a plurality of gyrometers, a plurality of accelerometers and a plurality of magnetometers.

20. The method according to claim 15, wherein the guidance orders are determined according to a guiding law implementing a proportional navigation with a bias allowing for a compensation and a shaping of the trajectory.

* * * * *